United States Patent [19]

Bjorke et al.

[11] Patent Number: 4,959,654

[45] Date of Patent: Sep. 25, 1990

[54] DIGITALLY GENERATED TWO CARRIER PHASE CODED SIGNAL SOURCE

[75] Inventors: Merlin D. Bjorke, Hennepin; Baard H. Thue, Anoka, both of Minn.

[73] Assignee: Honeywell Inc., Minneapolis, Minn.

[21] Appl. No.: 241,688

[22] Filed: Sep. 7, 1988

Related U.S. Application Data

[60] Division of Ser. No. 40,036, Apr. 20, 1987, Pat. No. 4,851,852, which is a continuation-in-part of Ser. No. 713,118, Mar. 18, 1985, abandoned.

[51] Int. Cl.$^5$ .................. G01S 13/08; H04L 27/20
[52] U.S. Cl. .................. 342/120; 375/52; 375/55; 375/56; 375/67; 332/103
[58] Field of Search .................. 375/52, 55, 56, 67, 375/83, 84, 86; 332/103–105

[56] References Cited

U.S. PATENT DOCUMENTS

| | | | |
|---|---|---|---|
| 2,036,165 | 3/1936 | Usselman | 375/67 X |
| 2,652,556 | 9/1953 | Borsum et al. | 375/67 |
| 3,136,950 | 6/1964 | Mackey | 375/67 X |
| 3,215,779 | 11/1965 | Halm et al. | 375/56 |
| 3,454,904 | 7/1969 | Clites et al. | 375/67 X |
| 3,803,361 | 4/1974 | Nugent | 375/56 X |
| 3,816,657 | 6/1974 | Fletcher et al. | 375/56 X |
| 3,958,191 | 5/1976 | Jones, Jr. | 375/56 X |
| 4,049,909 | 9/1977 | Peck | 375/67 |
| 4,206,423 | 6/1980 | Nossen | 375/67 X |
| 4,580,277 | 4/1986 | Angello et al. | 375/67 |
| 4,656,647 | 4/1987 | Hotine | 375/52 |
| 4,726,039 | 2/1988 | Piesinger | 375/67 |

OTHER PUBLICATIONS

Baird et al., "The DS-1002 High-Speed Data System for Mobile Radio"; "Philips Telecomm. Rev.", (vol. 38, No. 4; 11/80; pp. 176–186.

Primary Examiner—Thomas H. Tarcza
Assistant Examiner—Bernarr Earl Gregory
Attorney, Agent, or Firm—Robert A. Pajak

[57] ABSTRACT

A high frequency signal is converted to a signal characteristic of two simultaneously present, closely spaced high frequency signals. A high frequency signal is passed through a controllable bi-phase modulating switch. The switch is controlled by the resultant output of a multiplier which multiplies the sign of two phase-related pulse trains.

7 Claims, 4 Drawing Sheets

DIGITALLY GENERATED TWO CARRIER PHASE CODED SIGNAL SOURCE

This application is a division of application Ser. No. 040,036, filed Apr. 20, 1987, now U.S. Pat. No. 4,851,852, which is a continuation-in-part of application Ser. No. 713118, filed 18 Mar. 1985, now abandoned.

BACKGROUND OF THE INVENTION

This invention relates to a coherent radar, and more particularly to an improved coherent radar altimeter.

As those skilled in the art will understand, coherent radar systems are sensitive to the phase consistency of the received echoes. Radar echoes from an extended surface, such as the surface of the earth, are such that, for a radar carried by a moving platform, the relative phase of the radio frequency (RF) pulses in a sequential pulse train rapidly decorrelate. For this reason use of coherent radar for aircraft altimeters has been heretofore impractical.

At the same time, as will also be appreciated by those skilled in the art, coherent systems offer advantages of consequence in terms of low peak transmitter power (enabling the use of solid state RF transmitters at C-band) and relative immunity to precision altimeter based upon coherent pulse operation. For example, operation to 50,000 feet and higher necessitates coherent operation in order to utilize solid state transmitters of reasonable cost. But prior art proposals for coherent pulsed radar altimeters have not been satisfactory. As mentioned above, return signal phase decorrelation caused by a Doppler shift as a result of platform motion and phase shifts due to topological irregularities within the return surface area has made coherent pulse altimeters using narrow bandwidth receivers impractical.

SUMMARY OF THE INVENTION

The object of this invention is a pulsed coherent radar altimeter which employs a narrow band receiver.

Another object of the invention is the provision of a novel digital coherent pulse generator for use in a narrow band coherent radar altimeter.

Briefly, this invention contemplates the provision of a coherent pulse radar which transmits a pulse comprised of the sum of at least two phase related RF signals spaced in frequency. The phase shift due to platform motion and return surface irregularity of the return signal is approximately the same for each carrier. The receiver produces a signal representative of the difference of the two carriers, which is substantially free of decorrelation effects, and which can be processed in a narrow band receiver using otherwise prior art techniques to produce the desired range information.

DETAILED DESCRIPTION OF THE INVENTION

Figure 1:
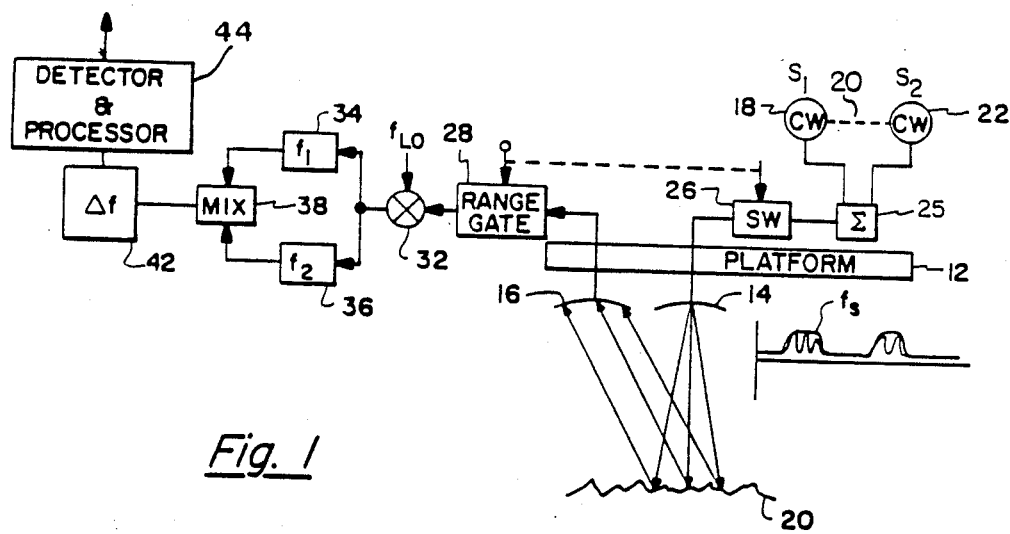
FIG. 1 is a block diagram of one embodiment of a coherent pulsed altimeter constructed in accordance with the teaching of this invention.

Referring now to FIG. 1, a moving platform 12, such as an aircraft moving from right to left, carries a pair of antennas 14 and 16, respectively a transmitting and a receiving antenna. A coherent RF pulse generator is connected to the transmitter antenna 14.

Figure 2:
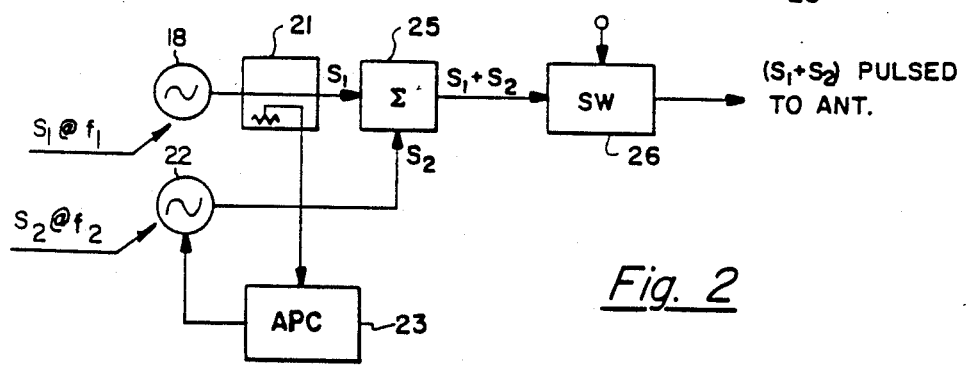
FIG. 2 is a block diagram of a pulse generator for use in the system of FIG. 1.

By way of explanation, the transmitter may comprise a pair of continuous wave oscillators 18 and 22 generating signals at two closely adjacent RF carrier frequencies $f_1$ and $f_2$. The oscillators 18 and 22 should be maintained in a fixed phase relationship to one another as indicated by dash line connection 20. This may be accomplished by any suitable manner known to those skilled in the art. FIG. 2 illustrates one technique for making source 18 and 22 provide signals $S_1$ and $S_2$, respectively, which are coherent with respect to each other.

In FIG. 2, an RF coupler 21 and a automatic phase control circuit 23 cross-couple two closely adjacent high frequency signal sources 18 and 22 to produce two phase related signals:

$$S_1 = E_1 \cos(2\pi f_1 t + \phi_1) \text{ and}$$

$$S_2 = E_2 \cos(2\pi f_2 t + \phi_2).$$

Signals $S_1$ and $S_2$ are coupled as inputs to an RF signal adder 25 whose output is coupled to a pulse forming switch 26. The output signal to antenna 14 is a series of RF pulses with an RF carrier signal equal to the sum of two coherent signals $S_1$ and $S_2$ having RF frequency $f_1$ and $f_2$ respectively.

Figure 3:
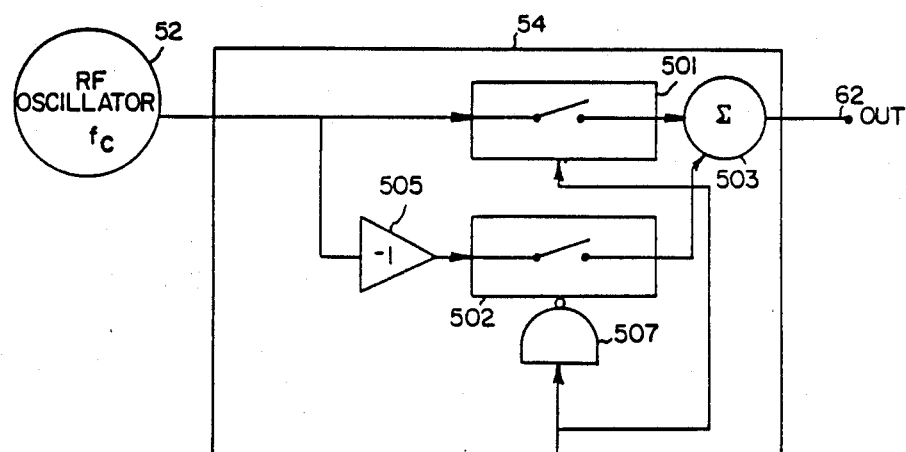
FIG. 3 is a schematic block diagram of a novel pulse generation using digital techniques to generate a coherent radar pulse having two RF carriers for use in the system.
Figure 3:
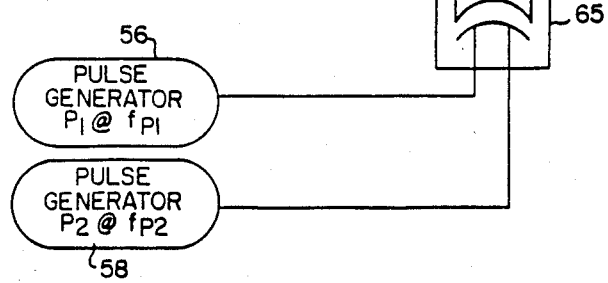

In practice, the problem of providing two satisfactory coherent carriers at reasonable costs is difficult to solve using conventional techniques, such as shown in FIGS. 1 and 2. For this reason the novel generator of FIG. 3 is preferred and will be described in detail following the description of FIG. 1.

The resultant radar output signal, produced by the circuit of FIGS. 1 and 2 is a series of high frequency radar pulses sampled from a coherent signal representable by:

Equation A $$K = \cos(w_1 t + \phi_1) + \cos(w_2 t + \phi_2)$$

where:
K = radar signal
$w_1 = 2\pi f_1$
$w_2 = 2\pi f_2$
$\phi_1$ & $\phi_2$ = phase angles The radar signal output K is equivalent to the simultaneous sum of two coherent high frequency signals.

The reflected signal from surface 20 as illustrated in FIG. 1, such as the surface of the earth, is received by an antenna 16 and coupled to the input of a conventional range gate 28.

A mixer 32 mixes the output of range gate 28 with a suitably chosen carrier $f_{LO}$ and the resultant signal is coupled to a pair of filters 34 and 36 centered respectively at the translated frequencies chosen for $f_1$ and $f_2$, and having a bandwidth equal to the anticipated Doppler span (i.e., range of frequency shift anticipated as a result of platform motion).

Another mixer 38 mixes the output signals from the filters 34 and 36. This combined signal is coupled to a narrow band filter 42 whose frequency is centered on the difference frequency between carrier signal frequencies $f_1$ and $f_2$, and whose bandwidth is commensurate with the information base band bandwidth. The output of this narrow band filter 42 is coupled to a suitable radar information detection and processing system 44, known in the art, from which range information is extracted.

In the operation of the invention, the wavelength of radio waves at a radio altimeter frequency of 4.3 GHz is 0.228 feet or 2.7 inches. The amplitude correlation distance δ is dependent on the RF wavelength and has been estimated as:

Equation B $$\delta = \frac{3.8\lambda}{4\pi v} \sqrt{\frac{h}{C\tau}}$$

λ=RF wavelength
v=ground speed
h=altitude above surface
τ=pulse width
C=velocity of light By transmitting two coherent RF carrier signals of closely spaced frequency, simultaneously, for each pulse, the effective RF wavelength is artificially increased. Upon reflection from the surface and reception by the receiver in two IF-channels, the two signals are mixed together and the altitude tracker operates on the resulting difference frequency signal whose phase variation with distance is diminished by the factor:

Equation C $$\frac{\Delta \phi}{\phi} = \frac{\lambda_1 - \lambda_2}{\lambda_2} = \frac{f_2}{f_1} - 1$$

For Example, at frequencies $f_1 = 4.3 \times 10^9$ and $f_2 = 4.3 \times 10^9 + 6 \times 10^4$ the phase rate factor is $13.9 \times 10^{-6}$ FIG. 3 illustrates a novel, digitally constructed, two coherent carrier, phase coded, signal source in accordance with the present invention. Shown in FIG. 3 is a single RF oscillator 52 whose output is fed through a digitally driven phase inverting switch 54. The digitally driven switch 54 is driven by a pair of phase related pulse generators 56 and 58. Generator 56 produces a continuous pulse train signal $P_1$ having pulse repetition frequency $f_{p1}$, and generator 58 produces continuous pulse train signal $P_2$ having pulse repetition frequency $f_{p2}$. Pulse signals $P_1$ and $P_2$ are graphically illustrated in FIGS. 4c and 4d respectively. The phase related signals $P_1$ and $P_2$ may be constructed by a variety of techniques including digital counters and dividers driven by and synchronized with a common clock signal.

As used herein, phase related signals, sometimes referred to as coherent signals, are those signals in which the ratio of the frequencies of the two signals may be reduced to a ratio of two integers. For example, referring to FIGS. 4c and 4d, exactly six cycles of $P_2$ occurs for each cycle of $P_1$ (i.e., 6:1 ratio). As just previously mentioned, if $P_1$ and $P_2$ are derived by division from a common clock, signals $P_1$ and $P_2$ will be phase related signals. Further, as will be described in more detail below, the relative phase between the pulse train signals $P_1$ and $P_2$ may be controlled to provide further phase coding of the simultaneous generation of the two carrier frequency components.

The output of digitally controlled switch 54 is a signal having a pair of phase related signal components at frequencies $f_{p1}$ and $f_{p2}$ with a controllable relative phase. Signals $P_1$ and $P_2$ are presented to a digital multiplier 65 for generating a product signal M which will be subsequently described. Signal M provides the control signal for digitally driven modulator switch 54.

Figure 4A:
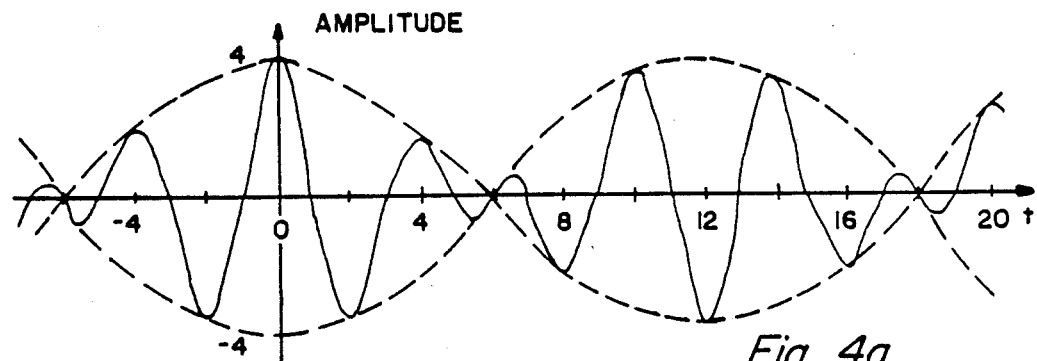
FIGS. 4a through 4h are a series of block diagrams useful in explaining the operation of FIG. 3.

Switch 54 is known as a bi-phase modulator. Switch 54 may be constructed by a variety of tehniques including appropriate application and control of a mixer as taught in RF SIGNAL PROCESSING COMPONENTS CATALOG of Watkins-Johnson Co., 1985/86, p. 66. In FIG. 3, switch 54 is illustrated using simply a pair of transmission gates 501 and 502. The output signal of RF oscillator 52, having frequency $f_c$ is passed through transmission gate 501 upon a positive logic state signal M. The output of transmission gate 501 is presented to a summing circuit 503. Further, the output of RF oscillator 52 is presented to transmission gate 502 through a phase inverting circuit 505. Transmission gate 502 is controlled by signal M passed through an inverting circuit 507. The output of transmission gate 502 is presented as a second signal to summing circuit 503. The signal from oscillator 52 will reach output 62 either via switch 501 or 502, never both at the same time, as determined by signal M. The output of summing circuit 503 is indicated as signal 62. The output signal 62, as will be subsequently described, is substantially the same as the output of adder circuit 25 illustrated in FIGS. 1 and 2. To understand the operation of the circuit of FIG. 3, reference again is made to the circuit of FIG. 1 and its RF signal envelope as illustrated in FIG. 4a.

The resultant signal spectrum of the radar signal generator of FIG. 1 has frequency components at frequencies $f_1$ and $f_2$ with a frequency difference therebetween directly related to the frequency difference between the sources 18 and 22. The desired radar signal having frequency components at frequencies $f_1$ and $f_2$ is again represented by Equation A, namely:

$K = \cos(w_1 t + \phi_1) + \cos(w_2 t + \phi_2)$

This may be converted via trigonometric manipulation into:

Equation D $$K = 2 \cos\left[\frac{W_1 + W_2 t}{2} + \frac{\phi_1 + \phi_2}{2}\right]$$

$$\cos\left[\frac{W_1 - W_2 t}{2} + \frac{\phi_1 + \phi_2}{2}\right]$$

FIG. 4a illustrates the envelope of radar signal K, in accordance with the present invention, where the radar signal is comprised of the sum of phase related carrier signals of differing frequency. FIG. 4a shows the envelope of radar signal K excluding any pulsing caused by switch 26. The exemplary waveform illustrated in FIG. 4a is one in which the ratio of the two frequencies of the two signals is six to one, and where the phase of the two signals is $$\phi_1 = \phi_2 = 0.$$

Radar signal K, as will be readily appreciated from the form of Equation D, can be generated by the product modulation of two signals having frequencies $(f_1+f_2)/2$ and $(f_1-f_2)/2$, respectively.

Figure 4B:
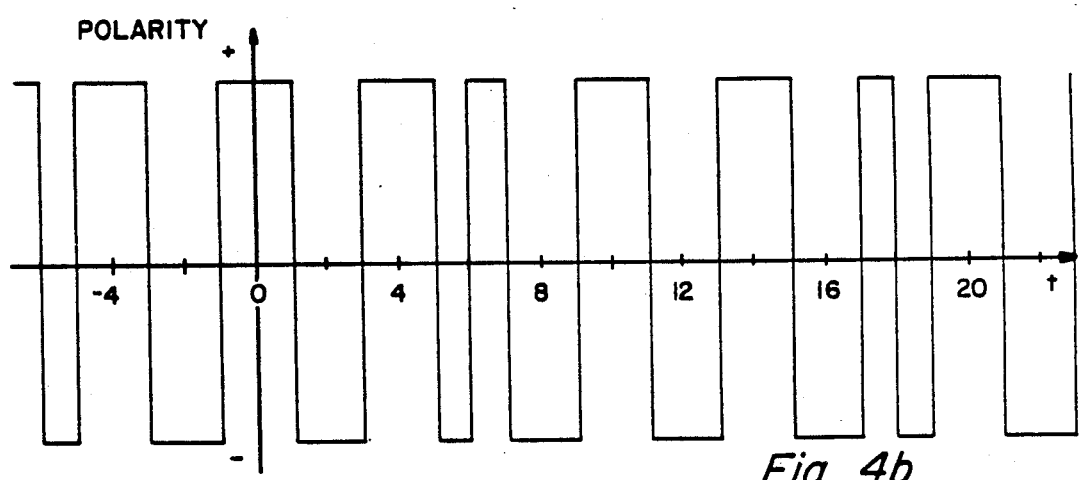
Figure 4C:
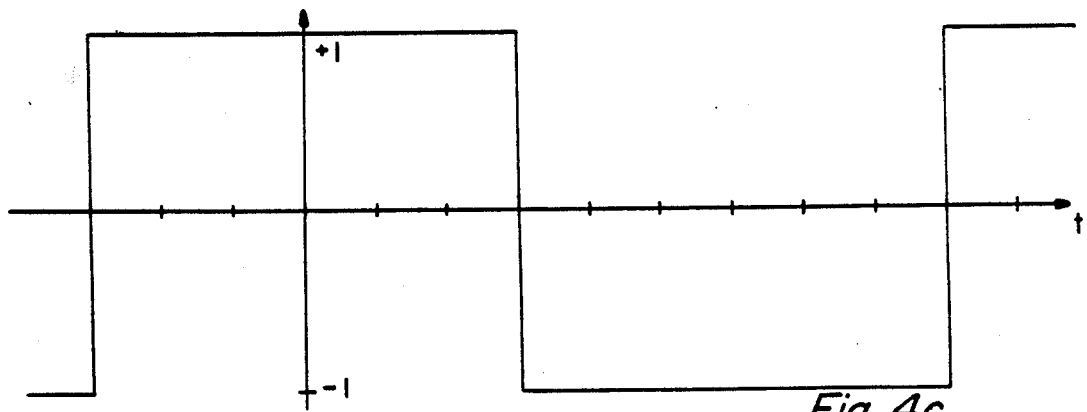
Figure 4D:
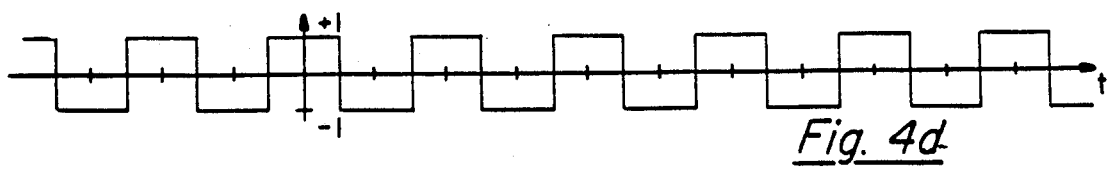

FIG. 4b illustrates the conversion of the signal envelope FIG. 4a into a switched waveform. In FIG. 4b, the switch point phase of FIG. 4a is preserved but the amplitude is held constant. FIG. 4b therefore represents a phase modulation control signal M:

$$M = \text{signum}(K).$$

The desired radar signal illustrated in FIG. 4a is synthesized in the present invention by phase modulating an RF carrier signal in accordance with the polarity of the phase modulation signal M or another signal indicative thereof. It will be appreciated by those skilled in the art that the waveform of FIG. 4b is the product of the waveforms shown in FIGS. 4c and 4d which are representative of pulse train signals $P_1$ and $P_2$.

Referring again to FIG. 3, digital pulse generators 56 and 58 are presented to digital multiplier 65 to digitally construct the digital equivalent of modulation signal M. One example of digital multiplier 65 is illustrated in FIG. 3 as an exclusive-or circuit 67. The output of digital multiplier 67, signal M, is presented to bi-phase modulating switch 54.

In operation, switch circuit 54 of FIG. 3: (i) passes the signal of RF oscillator 52 to switch output 62 in response to one state of the output of digital multiplier 65, and (ii) passes 180° phase inverted signal of RF oscillator 52 to switch output 62 in response to a second state of the output of digital multiplier 65. The resulting signal output 62 is a signal substantially equivalent as that provided by the output of summing circuit 25 of FIG. 2. That is, the output radar signal of the circuit of FIG. 3 is a radar signal comprised of the sum of two phase related signals with different frequencies as shown in FIGS. 4b, c and d, but translated in frequency to be centered around the frequency $f_c$ of oscillator 52 in FIG. 3.

Figure 4E:
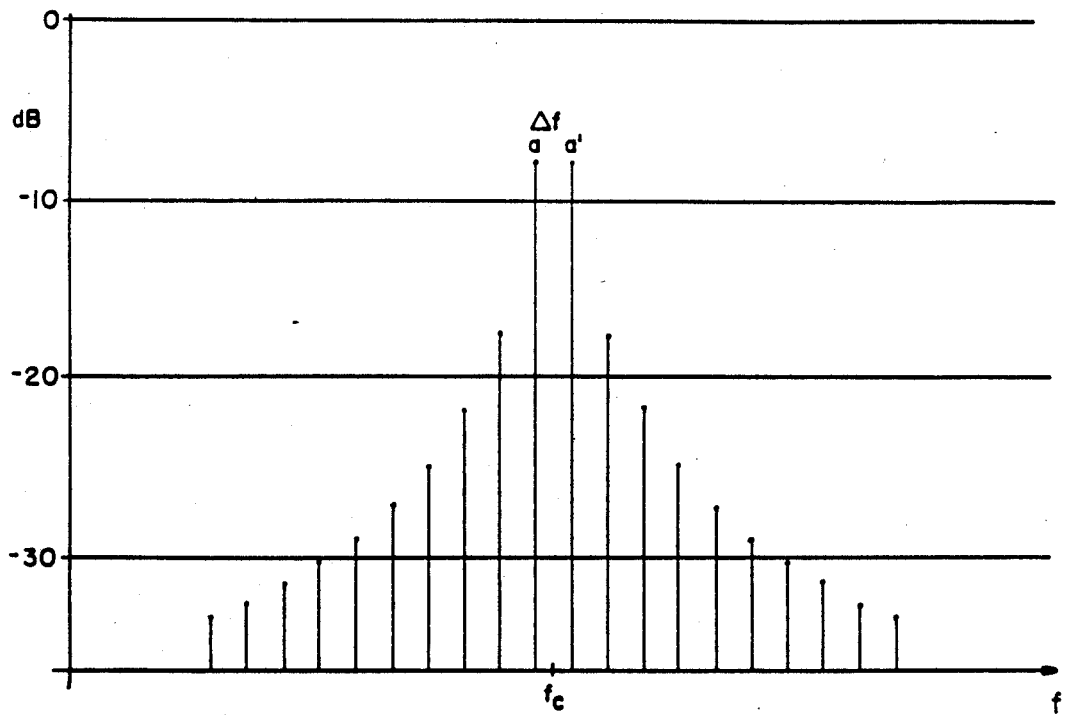

Investigation of the spectrum produced by the circuit of FIG. 3 produces the line spectrum shown in FIG. 4e which has a desired frequency line pair a and a' plus a host of harmonics at least 9.4 dB down from the desired pair. The line spacing is $$f = f_{p1} - f_{p2}$$

and the center frequency $f_c$ is the frequency of RF signal oscillator 52.

Figure 4F:
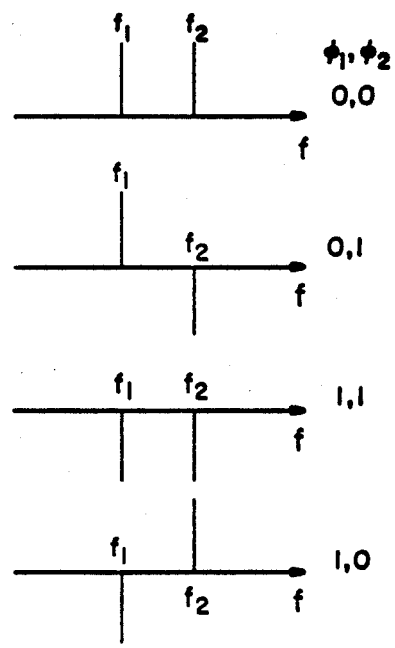

The phase of the main signal components (a and a') is taken as {0, 0} or {180°, 180°} in synthesizing the radar signal resulting from the modulation signal of FIG. 4b. The specific choice of 0° or 180° is arbitrary but must be consistent once chosen. With two major carriers there are, then, four relative phase combinations. This may be diagrammatically shown as in FIG. 4f, where 0 means in-phase, and 1 means 180° out of phase.

Figure 4G:
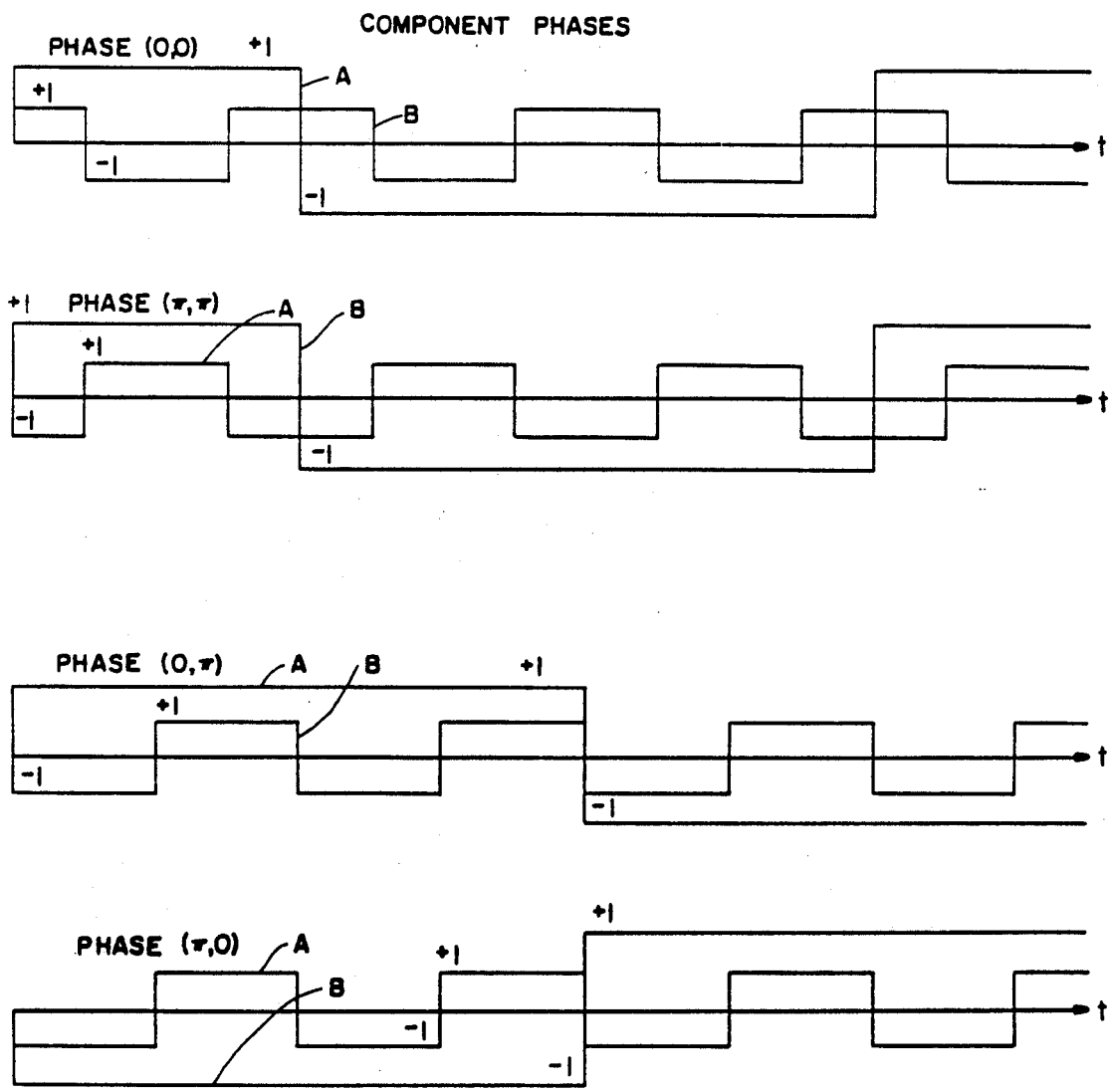

With use of pulse generators 56 and 58, the phase relationship between the desired carrier signals having frequency having frequency difference $f_{p2} - f_{p1}$ can be easily controlled. The switch drive functions shown in FIG. 4g can be easily generated from a reference pulse generator through standard logic elements, digital counters, flip-flops, and the like. Addition of a phase select switch allows sequential, individual, phase coding of a synthesized pair of signal carriers as determined by the pulse generator frequencies $f_{p1}$ and $f_{p2}$.

Figure 4H:
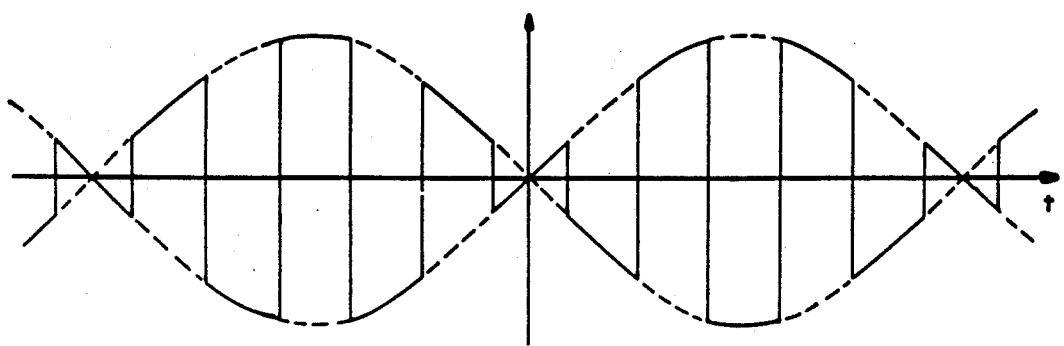

In applications where the host of sidebands shown in FIG. 4e is deleterious to the intended use, a sinusoidal taper may be applied as indicated in FIG. 4h.

Those skilled in the art will recognize that only the preferred embodiment of the present invention is disclosed herein and that the embodiment may be altered and modified without departing from the true spirit and scope of the invention as defined in the accompanying claims.

What is claimed is:

1. A signal generator for generating two high frequency phase related frequency components, the generator comprising in combination:

a high frequency oscillator providing a first signal;

a controllable bi-phase modulating switch having input means for receiving said first signal, and a control input means for receiving a control signal, and an output means;

means for generating first and second phase related pulse trains in which said first pulse train is of a first frequency and said second pulse train is of a second frequency; and means for obtaining a product signal representative of the product of said first and second pulse trains, said product signal providing said control signal such that the output signal from said switch output means is a signal having first and second frequency components related to said first and pulse train frequencies.

2. The signal source of claim 1 further comprising means for selecting the relative phase between said first and second pulse trains.

3. The generator of claim 1 wherein said means for obtaining a product signal includes a circuit for providing the exclusive-or operator on at least two signals.

4. A signal generator for generating an RF signal comprised of two phase related frequency components, said signal generator comprising:

a high frequency oscillator for generating a first RF signal;

first and second phase related pulse generators for generating first and second pulse train signals having a first and a second repetition frequency, respectively;

first means responsive to said first and second pulse train signals for providing a product signal representative of the product of said first and second pulse train signals; and a controllable bi-phase modulating switch having input means connected to the output of said high frequency ocsillator, and an output means, said switch including control means for receiving said product signal, said switch means operative to pass said first RF signal to said output means in response to a first condition of said first product signal, and passing said first RF signal to said output means with 180° phase inversion in response to a second condition of said product signal.

5. The generator of claim 4 wherein said first means is an exclusive-or circuit.

6. The signal source of claim 4 further comprising means for selecting the relative phase between said first and second pulse trains.

7. A signal generator for generating two frequency phase related frequency components, the generator comprising in combination:
   an oscillator providing a first signal;
   a controllable bi-phase modulating switch having input means for receiving said first signal, and a control input means for receiving a control signal, and an output means;
   means for generating first and second phase related pulse trains in which said first pulse train is of a first frequency and said second pulse train is of a second frequency; and
   means for obtaining a product signal representative of the product of said first and second pulse trains, said product signal providing said control signal such that the output signal from said switch output means is a signal having first and second frequency components related to said first and pulse train frequencies.

* * * * *